(12) United States Patent
Rally et al.

(10) Patent No.: US 7,702,893 B1
(45) Date of Patent: Apr. 20, 2010

(54) INTEGRATED CIRCUITS WITH CONFIGURABLE INITIALIZATION DATA MEMORY ADDRESSES

(75) Inventors: Nicholas J. Rally, San Mateo, CA (US); Dirk A. Reese, Campbell, CA (US); Keith Duwel, San Jose, CA (US)

(73) Assignee: Altera Corporation, San Jose, CA (US)

( * ) Notice: Subject to any disclaimer, the term of this patent is extended or adjusted under 35 U.S.C. 154(b) by 762 days.

(21) Appl. No.: 11/525,657

(22) Filed: Sep. 22, 2006

(51) Int. Cl.
*G06F 15/177* (2006.01)

(52) U.S. Cl. .............................. 713/1; 713/2

(58) Field of Classification Search ...... 713/1, 713/2
See application file for complete search history.

(56) References Cited

U.S. PATENT DOCUMENTS

| | | | | |
|---|---|---|---|---|
| 4,268,904 | A * | 5/1981 | Suzuki et al. ................. | 710/40 |
| 5,155,833 | A * | 10/1992 | Cullison et al. ................ | 713/2 |
| 5,448,716 | A * | 9/1995 | Hardell et al. ............... | 713/375 |
| 5,867,702 | A * | 2/1999 | Lee ............................... | 713/1 |
| 5,938,765 | A * | 8/1999 | Dove et al. ..................... | 713/1 |
| 6,097,211 | A * | 8/2000 | Couts-Martin et al. ........ | 326/40 |
| 6,108,781 | A * | 8/2000 | Jayakumar ..................... | 713/2 |
| 6,338,101 | B1 | 1/2002 | Kakimi | |
| 6,421,775 | B1 * | 7/2002 | Brock et al. ................... | 713/1 |
| 6,584,560 | B1 * | 6/2003 | Kroun et al. .................... | 713/2 |
| 6,754,882 | B1 | 6/2004 | Sanchez et al. | |
| 6,792,527 | B1 | 9/2004 | Allegrucci | |
| 6,803,785 | B1 | 10/2004 | May et al. | |
| 6,823,505 | B1 | 11/2004 | Dowling | |
| 6,877,063 | B1 | 4/2005 | Allegrucci et al. | |
| 7,356,680 | B2 * | 4/2008 | Svensson et al. ............... | 713/1 |
| 2002/0138156 | A1 * | 9/2002 | Wong et al. ..................... | 700/8 |

OTHER PUBLICATIONS

"Using the MAX II Parallel Flash Loader with the Quartus II Software", Application Note AN-386-1.1 of Altera Corporation (2006) pp. 1-26.

* cited by examiner

*Primary Examiner*—Chun Cao
(74) *Attorney, Agent, or Firm*—Treyz Law Group; G. Victor Treyz

(57) ABSTRACT

Systems and methods are provided for avoiding memory address conflicts in systems containing shared memory. Upon system power up, programmable logic device integrated circuits, microprocessors, and other integrated circuits with processing capabilities are provided with unique initialization data memory addresses. Each unique initialization data memory address corresponds to a respective non-overlapping block of memory in the shared memory. During initialization operations, the integrated circuits retrieve initialization data from the shared memory using the unique initialization data memory addresses. The integrated circuits can be organized using a master-slave architecture. The master can load the initialization data memory addresses into the slave integrated circuits using communications circuitry that is active after the slaves have powered up but before the slaves have been initialized.

20 Claims, 5 Drawing Sheets

INTEGRATED CIRCUITS WITH CONFIGURABLE INITIALIZATION DATA MEMORY ADDRESSES

BACKGROUND

This invention relates to integrated circuits and systems that share memory, and more particularly, to integrated circuits with adjustable initialization data memory addresses that are used when accessing initialization data in shared memory.

Electronic systems often contain integrated circuits with processing capabilities. Examples of integrated circuits with processing capabilities include microprocessors, microcontrollers, digital signal processors, certain application specific integrated circuits, and programmable logic devices.

When these integrated circuits are initialized, they typically are loaded with initialization data. For example, microprocessors are loaded with boot code upon initialization. The boot code provides the microprocessor with basic functionality, so that the microprocessor can undertake more complex system boot-up functions. For example, the boot code includes a basic set of instructions that allow the microprocessor to load and run application code.

As another example, programmable logic devices are initialized by loading configuration data. Once configuration data is loaded into configuration memory in a programmable logic device, the configuration memory generates static output signals that are applied to programmable logic. The states of the static output signals configure the programmable logic to perform desired custom logic functions.

Initialization data such as the boot code for microprocessors and the configuration data for programmable logic devices is stored in memory. When a system boots up, each integrated circuit retrieves its initialization data. In some system architectures, each integrated circuit retrieves its initialization data from a separate memory. For example, a microprocessor can retrieve its boot code from a read-only-memory chip and a programmable logic device can retrieve its configuration data from a specialized memory-based circuit called a configuration device.

In other system architectures, shared memory is available to system components. The use of shared memory reduces system cost and complexity, because initialization data such as boot code or programmable logic device configuration data may be stored on a large inexpensive memory device such as a flash memory. System designers must take care not to create memory address conflicts when using shared memory.

Some processors are available as "bottom-boot" or "top-boot" devices. A bottom-boot processor retrieves its boot code by starting at an address at the bottom of the memory's memory space and working towards the top (i.e., by successively incrementing the memory address from a starting address at the bottom of the memory space while reading the boot code from the memory). A top-boot processor retrieves its boot code by working from the top of the memory space towards the bottom. Processors are also available that can be configured to have different boot code addresses depending on which voltages are applied to some of their pins upon power-up.

Some memory addressing conflicts can be avoided using these approaches, but in systems with multiple devices, conflicts may become unavoidable unless the system designer avoids or reduces the use of shared memory.

It would therefore be desirable to provide integrated circuits that can be loaded with a desired initialization data memory address.

SUMMARY

In accordance with the present invention, systems and methods are provided that prevent memory address conflicts in systems with shared memory. A system may be implemented on a circuit board or other mounting structure. A master integrated circuit and slave integrated circuits access the shared memory over a shared memory bus. The shared memory may be, for example, a flash memory.

Upon system power-up, a power management circuit initializes the master integrated circuit. The master integrated circuit uses an initialization data memory address to retrieve initialization data from the shared memory over the shared memory bus. If, for example, the master integrated circuit is a microprocessor, the microprocessor may use a default boot code memory address to retrieve boot code from the shared memory.

The boot code or other initialization data obtained by the master integrated circuit contains unique initialization data memory addresses for each of the slave integrated circuits. Each initialization data memory address corresponds to the starting address of a different non-overlapping block of memory in the shared memory. Each block of memory contains initialization data for a respective one of the slave integrated circuits.

After the master integrated circuit has been initialized, the master integrated circuit can load the initialization data memory addresses obtained from the boot code into the slave integrated circuits. The master integrated circuit can load the initialization data memory addresses into the slave integrated circuits using communications circuitry in the slave integrated circuits that is active after the slave integrated circuits have been powered up, but before the slave integrated circuits have been initialized.

The slave integrated circuits may be initialized by the master integrated circuit using initialization control signals. During initialization operations, each slave integrated circuit uses its loaded initialization data memory address to retrieve its initialization data from the shared memory. Slave integrated circuits may be microprocessors, programmable logic devices, or any other suitable type of integrated circuit with processing capabilities. During initialization, slave microprocessors load boot code and slave programmable logic device integrated circuits load configuration data.

Further features of the invention, its nature and various advantages will be more apparent from the accompanying drawings and the following detailed description of the preferred embodiments.

DETAILED DESCRIPTION

The present invention relates to loading customized initialization data memory addresses into integrated circuits at run time, so that the integrated circuits can retrieve initialization data from a shared memory without causing address conflicts. The integrated circuits may be programmable logic device integrated circuits, microprocessors, microcontrollers, digital signal processors, application specific integrated circuits containing processing circuitry, or any other suitable integrated circuit with processing circuitry.

The initialization data that is loaded is used to prepare the integrated circuit for operation. For example, a microprocessor loads boot code, which is used to initialize the microprocessor. As another example, a programmable logic device integrated circuit loads configuration data, which is used to configure programmable logic within the device.

The integrated circuits contain internal memory into which the initialization data is loaded. For example, microprocessors contain memory into which boot code is loaded for execution by the microprocessor. Programmable logic devices contain configuration memory into which configuration data is loaded.

Figure 1:
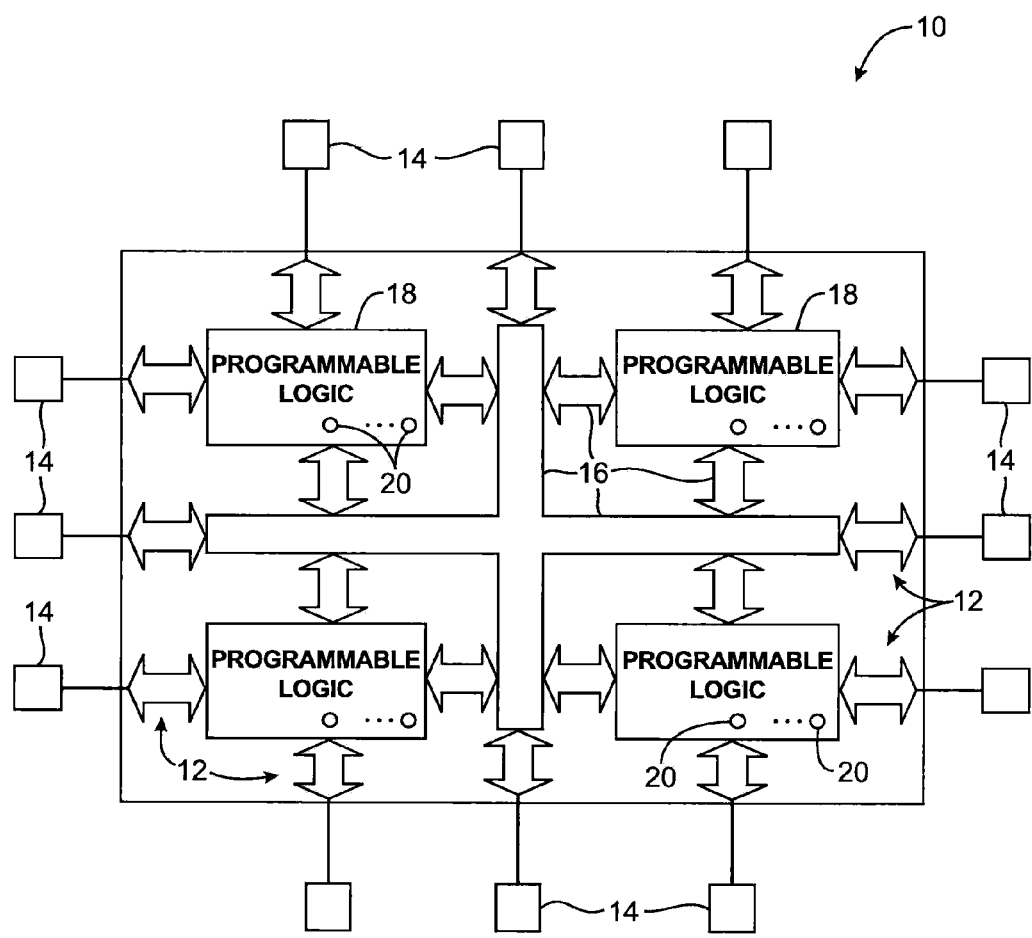
FIG. 1 is a diagram of an illustrative programmable logic device integrated circuit in accordance with the present invention.

An illustrative programmable logic device 10 in accordance with the present invention is shown in FIG. 1.

Programmable logic device 10 has input/output circuitry 12 for driving signals off of device 10 and for receiving signals from other devices via input/output pins 14. Interconnection resources 16 such as global and local vertical and horizontal conductive lines and busses may be used to route signals on device 10. Interconnection resources 16 include conductive lines and programmable connections between respective conductive lines and are therefore sometimes referred to as programmable interconnects 16.

Programmable logic 18 may include combinational and sequential logic circuitry. The programmable logic 18 may be configured to perform a custom logic function. The programmable interconnects 16 may be considered to be a type of programmable logic 18.

Programmable logic device 10 contains programmable memory elements 20. Memory elements 20 are generally volatile memory elements such as random-access-memory (RAM) cells. Because memory elements 20 are loaded with configuration data during programming, memory elements 20 are sometimes referred to as configuration memory, configuration RAM, or programmable memory elements.

Memory elements 20 can be loaded with configuration data (also called programming data) using pins 14 and input/output circuitry 12. Once loaded, the memory elements each provide a corresponding static control output signal that controls the state of an associated logic component in programmable logic 18. For example, the outputs of the loaded memory elements 20 may be applied to the gates of metal-oxide-semiconductor transistors in programmable logic 18 to turn certain transistors on or off and thereby configure the logic in programmable logic 18. Programmable logic circuit elements that may be controlled in this way include pass transistors, parts of multiplexers (e.g., multiplexers used for forming routing paths in programmable interconnects 16), look-up tables, logic arrays, AND, OR, NAND, and NOR logic gates, etc.

The circuitry of device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements, each containing a four-input look-up table, one or more registers, and programmable multiplexer circuitry. The larger regions may be, for example, logic array blocks containing multiple logic elements.

The resources of device 10 such as programmable logic 18 may be interconnected by programmable interconnects 16. Interconnects 16 generally include vertical and horizontal conductors. These conductors may include global conductive lines that span substantially all of device 10, fractional lines such as half-lines or quarter lines that span part of device 10, staggered lines of a particular length (e.g., sufficient to interconnect several logic array blocks or other such logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, the device 10 generally also includes some programmable logic associated with the programmable interconnects, memory, and input-output circuitry on device 10. For example, input-output circuitry 12 may contain programmable input and output buffers. Interconnects 16 may be programmed to route signals to a desired destination.

Programmable logic devices such as device 10 of FIG. 1 and other integrated circuits with processing capabilities may be assembled to form a system. A typical system 22 that is constructed using multiple integrated circuits with processing capabilities is shown in FIG. 2.

Figure 2:
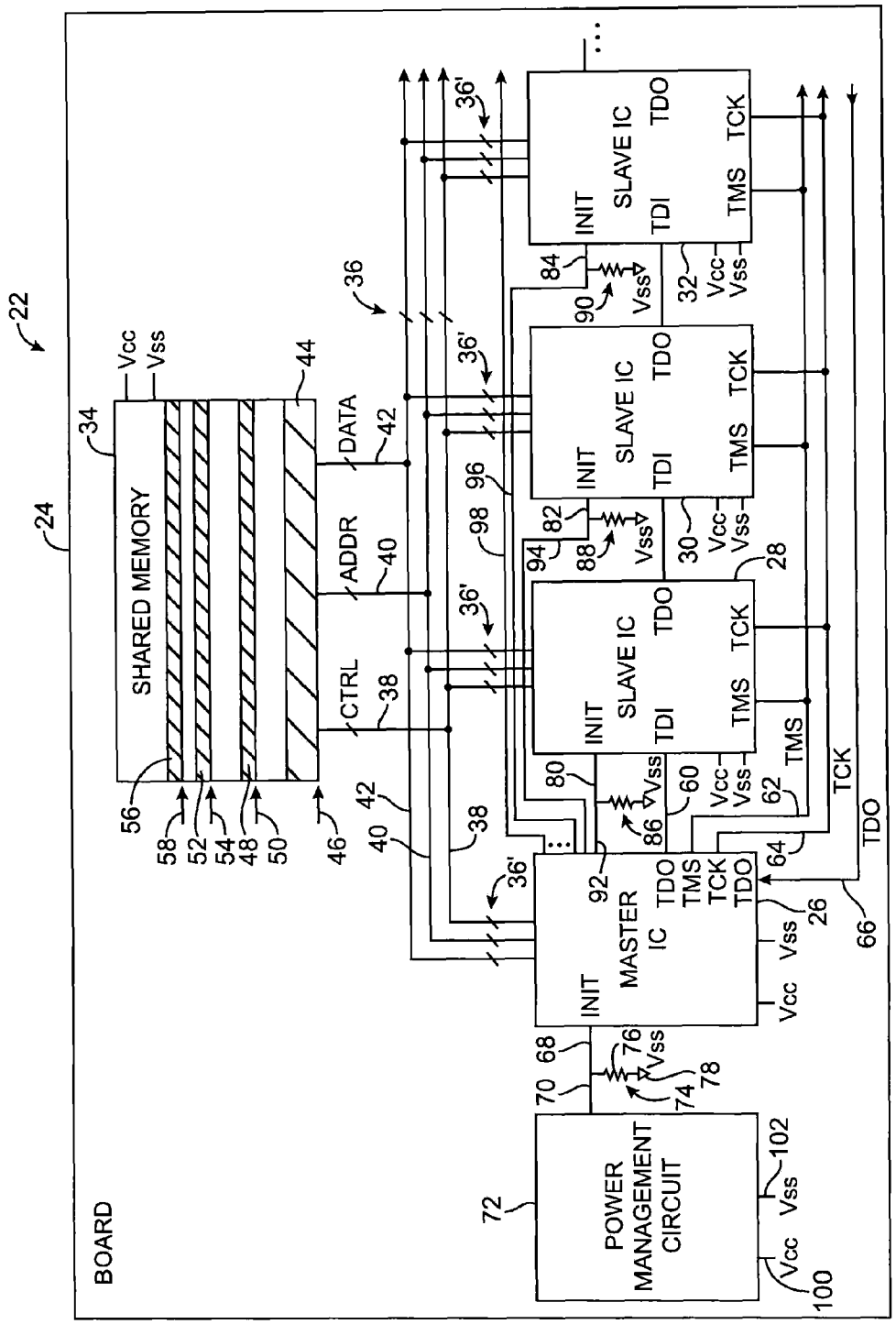
FIG. 2 is a diagram of an illustrative system environment in which integrated circuits with processing capabilities such as microprocessors and programmable logic devices use a shared memory device for storing initialization data in accordance with the present invention.

In the example of FIG. 2, system 22 has been constructed by mounting components on a circuit board 24. If desired, multiple boards or other mounting structures may be used to interconnect system components. The single-board arrangement of FIG. 2 is shown as an example.

Board 24 has multiple integrated circuits with processing capabilities 26, 28, 30, and 32. In the illustrative example of FIG. 2, there are four integrated circuits with processing capabilities. This is merely illustrative. In general, a system may have any suitable number of integrated circuits with processing capabilities.

Integrated circuits 26, 28, 30, and 32 access a shared memory 34 over a shared memory bus 36. Shared memory 34 may be any suitable memory device. Typically, the shared memory 34 is a nonvolatile memory such as a flash memory that is compliant with the Common Flash memory Interface (CFI) standard. Memory 34 preferably uses well-known or open standards, so that a system designer can design a system 22 that uses many integrated circuits with processing capabilities, each of which is able to easily share access to memory 34. Although systems can be designed that use closed or proprietary memory interface standards, the use of closed standards makes the system designer's task more difficult. Flash memory that uses the CFI standard is readily available and is generally inexpensive, which helps to minimize system cost.

Bus 36 contains control lines 38, address lines 40, and data lines 42. Control lines 38 are used to convey control signals for controlling read operations and write operations for memory 34. Control lines 38 may include any suitable control paths. With one particularly suitable arrangement, control lines 38 are used to convey a write enable signal (WE), a chip enable (CE) signal, and an output enable (OE) signal. The write enable signal WE is used to enable memory 34 during write operations. The WE signal is taken high to write data to memory 34 and is taken low to read data from memory 34. The chip enable signal CE is used to turn on memory 34. The output enable signal OE is used to control the direction of data flowing over data lines 42. There may be any suitable number of data lines 42 in bus 36. For example, there may be 8 data lines, 16 data lines, etc. There may also be any suitable number of address lines 40 in bus 36. For example, there may be 20-25 address lines.

The bus 36 may be fabricated from conductive traces formed on circuit board 24 or other suitable conductive paths. Integrated circuits such as integrated circuits 26, 28, 30, and 32 may be connected to bus 36 using bus branch portions 36'. Conductive paths may also be used to form the other paths on board 24, such as power supply paths labeled Vcc and Vss, which are used to distribute a positive power supply voltage Vcc (e.g., 1.1 volts or any other suitable voltage level) and a ground power supply voltage Vss (e.g., 0 volts or any other suitable voltage level). Other power supply voltages and power supply voltage distribution paths may be used in system 22 if desired.

One of the integrated circuits with processing capabilities (integrated circuit 26) is configured as a master and the remaining integrated circuits with processing capabilities (integrated circuits 28, 30, and 32) are configured as slave integrated circuits. The master integrated circuit 26 is referred to as a master, because master integrated circuit 26 is the first integrated circuit in system 22 to be initialized upon power up. Initialization data for master integrated circuit 26 is stored in a block 44 of memory in shared memory 34. During initialization operations, master integrated circuit 26 loads its initialization data from block 44 of shared memory 34 over bus 36. In the example of FIG. 2, master integrated circuit 26 is configured as a bottom-boot device, so the starting address for memory block 44 is a memory address at the bottom of the memory space for memory 34 (i.e., memory address 0000H). The initialization data memory address for block 44 (i.e., the starting address for block 44) is illustrated by arrow 46.

To avoid memory addressing conflicts, different non-overlapping regions of shared memory 34 are used to store the initialization data for each integrated circuit. In the example of FIG. 2, the initialization data for slave integrated circuit 28 is stored in memory block 48. The initialization data for slave integrated circuit 30 is stored in memory block 52. Memory block 56 is used to store the initialization data for slave integrated circuit 32.

The memory blocks 44, 48, 52, and 56 are maintained in separate regions of shared memory 34. Each memory block has its own starting memory address. The starting memory addresses for memory blocks 44, 48, 52, and 56 are illustrated using arrows. Arrow 46 indicates the starting address for the memory block 44. Arrow 50 indicates the starting address for the memory block 48. The starting memory addresses for memory blocks 52 and 56 are represented by arrows 54 and 58.

During the process of accessing the data associated with each memory block, data is initially read from the starting memory address. An address pointer is then incremented successively, so that each successive memory location in a block is addressed. As an example, if the start memory address for block 48 is AFFCH, initialization data is retrieved from block 48 by reading data from memory addresses AFFCH, AFFDH, AFFEH, etc., until the end of the memory block 48 is reached.

After master integrated circuit 26 has been initialized by loading master integrated circuit 26 with its initialization memory from block 44, master integrated circuit 26 uses built-in communications capabilities that are available in integrated circuits 28, 30, and 32 upon power-up to provide circuits 28, 30, and 32 with their initialization data memory addresses.

Information on the initialization data memory addresses for each of the integrated circuits with processing capabilities in system 22 may be obtained using any suitable technique. With one illustrative arrangement, the initialization data memory addresses for each of the integrated circuits is included in the initialization data for the master integrated circuit and is stored in block 44. During the process of initializing master integrated circuit 26, master integrated circuit 26 loads the initialization data of block 44 into master integrated circuit 26, thereby transferring the initialization data memory addresses of each of the slave integrated circuits to master integrated circuit 26. Master integrated circuit 26 then provides slave integrated circuits 28, 30, and 32 with their respective initialization data memory addresses 50, 52, and 58. Each slave integrated circuit stores its initialization data memory address in a corresponding initialization data memory address register or other suitable storage structure.

Slave integrated circuits 28, 30, and 32 are able to receive and store their initialization data memory addresses before they have been initialized using built-in communications capabilities. These built-in communications capabilities are provided using relatively basic communications circuitry that becomes available upon power-up. With one particularly suitable arrangement, the basic power-up communications circuitry is so-called JTAG communications circuitry. JTAG communications circuitry is compliant with a set of standards developed by the Joint Test Action Group. JTAG techniques may be used to facilitate testing of integrated circuits. Programmable logic device integrated circuits can also be programmed using JTAG techniques.

Integrated circuits containing JTAG circuitry include a chain of registers called a boundary scan chain. The JTAG circuitry is used to implement a JTAG state machine. The boundary scan chain can be loaded with test data and can be used to capture test data from within an integrated circuit during testing. This makes it possible to test nodes that are otherwise inaccessible to test probes. A JTAG port includes a TCK pin, a TMS pin, a TDI pin, and a TDO pin. The TCK pin carries a JTAG clock signal. The TMS pin carries a mode select signal. The value of the TMS signal at the rising edge of the TCK clock signal controls which state the JTAG state machine assumes. The TDI and TDO pins carry data. Data is output on a TDO pin and is received at a TDI pin.

In system 22, master integrated circuit 26 and slave integrated circuits 28, 30, and 32 form a chain in which data is supplied on the TDO pin of one integrated circuit and is received on a corresponding TDI pin of a subsequent integrated circuit. This allows JTAG data such as the initialization data memory addresses 50, 54, and 58 to be passed from the master integrated circuit 26 to each of the slave integrated circuits 28, 30, and 32. For example, data can be passed from the master integrated circuit 26 to the slave integrated circuit 28 via data path 60, while the master integrated circuit 26 supplies mode select signal TMS on path 62 and clock signal TCK on path 64. Path 66 forms a return segment for the test data loop.

The JTAG circuitry of the integrated circuits becomes active as soon as the integrated circuits have successfully powered up. It is therefore not necessary to initialize the integrated circuits for their JTAG circuit to operate properly. As an example, JTAG circuitry becomes active in a microprocessor before the microprocessor has loaded and run its boot code. In programmable logic device integrated circuits, JTAG circuitry becomes active before configuration data has been loaded. As the system 22 powers up, the master integrated circuit 26 can provide each slave integrated circuit with its respective initialization data memory address. After each slave has received its initialization data memory address, each slave can use its respective initialization data memory address to load its associated initialization data from its associated memory block in shared memory 34.

The master integrated circuit 26 has an initialization control input 66. Power management circuit 72 supplies an initialization control signal to input 68 over path 70. Weak pull-down circuit 74 holds the voltage on line 70 and input 68 low (i.e., at ground voltage Vss) in the absence of an active output signal on line 70 from power management circuit 72. In the example of FIG. 2, pull-down circuit 74 includes a resistor 76 that is coupled between path 70 and a terminal 78 at ground power supply voltage Vss. This is merely illustrative. Any suitable biasing circuit may be used to bias line 70 and input 68 if desired.

Slave integrated circuits 28, 30, and 32 have respective initialization control inputs 80, 82, and 84. Master integrated circuit 26 supplies an initialization control signal on path 92 when it is desired to initialize slave integrated circuit 28. Path 94 is used to convey an initialization control signal from master integrated circuit 26 to initialization control input 82 of slave integrated circuit 30. Path 96 is used to convey an initialization control input signal from master integrated circuit 26 to initialization control input 84. If there are additional slave integrated circuits in system 22, initialization control signals can be provided to their initialization control input terminals from master integrated circuit 26 using additional paths such as path 98.

Bias circuit 86 is a pull-down circuit that holds initialization control input 80 low when master integrated circuit 26 is not actively producing an output on path 92. Bias circuits 88 and 90 are similarly used as pull-down circuits to hold the voltages on paths 94 and 96 low in the absence of any overriding control signal. By biasing the slave circuits in this way, the slave circuits are held in a steady, reset state upon power up.

In the example of FIG. 2, paths 92, 94, 96, and 98 are shown as being controlled by separate outputs from master integrated circuit 26. This is merely illustrative. For example, some of the initialization control inputs may be controlled by a common initialization control signal on a common path or additional logic may be used to generate and/or distribute the initialization control signals. In some integrated circuits, more than one signal may be used to start the initialization process.

Power management circuit 72 monitors the signals on power supply lines 100 and 102 during power up. When the voltages on lines 100 and 102 have reached their desired levels and are stable, the power management circuit 72 generates an initialization control signal on line 70 that initializes master integrated circuit 26. After initialization, master integrated circuit 26 uses its JTAG capabilities to provide each slave integrated circuit with its initialization memory address. The master integrated circuit then uses initialization control signals on paths 92, 94, and 96 to initialize the slave integrated circuits 28, 30, and 32. In the example of FIG. 2, power management circuit 72 is depicted as a stand-alone integrated circuit. This type of arrangement, which is often used for initializing microprocessors, is merely illustrative. If desired, the circuitry of power management circuit 72 may be incorporated into master integrated circuit 26.

Master integrated circuit 26 and slave integrated circuits 28, 30, and 32 may be programmable logic device integrated circuits, microprocessors, microcontrollers, digital signal processors, application specific integrated circuits containing processing circuitry, or any other suitable integrated circuits with processing circuitry. As an example, master integrated circuit 26 may be a microprocessor and slave integrated circuits 28, 30, and 32 may be programmable logic device integrated circuits. As another example, master integrated circuit 26 may be a programmable logic device integrated circuit and slave integrated circuits 28, 30, and 32 may be microprocessors. The system 22 may include a master integrated circuit that is a microprocessor and slave integrated circuits that are made up of a mixture of microprocessor and programmable logic devices. A programmable logic device integrated circuit or microprocessor may also be used as the master in a system in which there are many different types of slaves (e.g., microprocessor slaves, digital signal processor slave, and programmable logic device slaves).

The operations that are involved in initializing an integrated circuit depend on the nature of the integrated circuit.

Processors such as microprocessors are initialized using a reset signal, so when one of the integrated circuits in system 22 is a microprocessor, that integrated circuit's initialization control input is a reset input. For example, when master integrated circuit 26 is implemented using a microprocessor, the initialization control input 68 of integrated circuit 26 is generally referred to as a reset input.

Similarly, the process of initializing a processor such as a microprocessor is generally referred to as "resetting" the microprocessor. In a typical arrangement, the reset control path is biased low by a suitable biasing circuit (e.g., circuit 74 of FIG. 2). When it is desired to reset the microprocessor, the reset signal is toggled high. The microprocessor senses this activity on its reset input and begins reset operations.

The initialization data that is loaded when a microprocessor is reset is generally referred to as boot code. The memory address at which the boot code is stored in the shared memory may be referred to as a boot code address. During reset operations, the microprocessor uses the boot code address to retrieve the boot code from an appropriate block of memory in the shared memory 34. The boot code is then loaded into the microprocessor.

Programmable logic device integrated circuits are programmed using configuration data. During initialization operations, programmable logic devices load configuration data, rather than boot code. The initialization control signal that is used to initialize a programmable logic device integrated circuit is generally referred to as a configuration control signal. In certain programmable logic device integrated circuit parts available from Altera Corporation of San Jose, Calif., the configuration control signal is referred to as the "nconfig" signal. When an integrated circuit in system 22 is implemented using a programmable logic device integrated circuit, the configuration process is initiated by toggling the configuration control signal high. The programmable logic device integrated circuit senses this activity on its configuration control input and begins configuration operations.

The initialization data that is loaded when a programmable logic device integrated circuit is configured is generally referred to as configuration data or programming data. The memory address at which the configuration data is stored in the shared memory may be referred to as a configuration data address or a configuration data memory address. During configuration operations, the programmable logic device integrated circuit uses the configuration data address to retrieve the configuration data from the block of shared memory in which the configuration data is stored. The configuration data is then loaded into the configuration memory of the programmable logic device integrated circuit.

Figure 3:
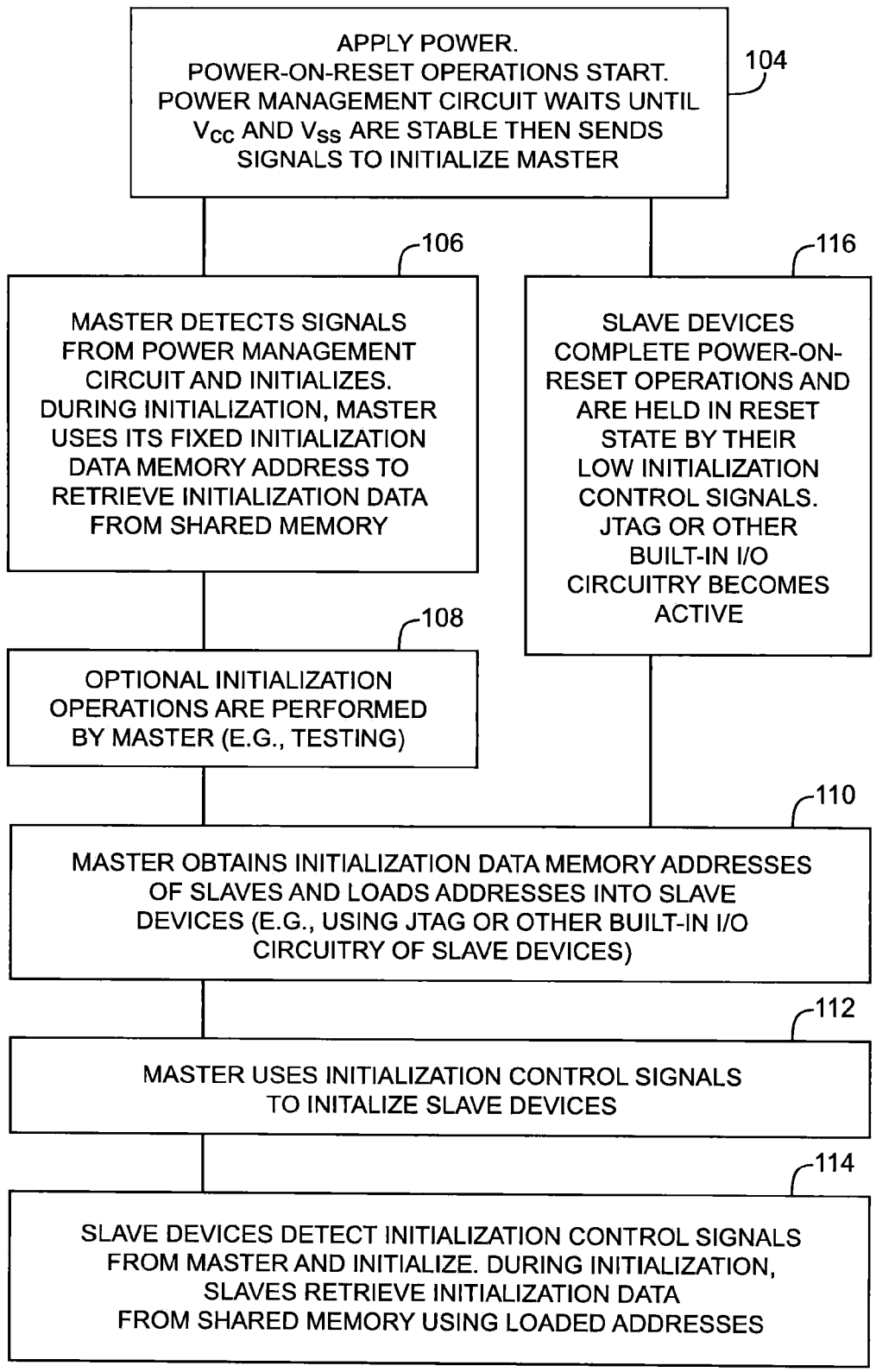
FIG. 3 is a flow chart of illustrative steps involved in loading integrated circuits with individual initialization data memory addresses in accordance with the present invention.

Illustrative steps involved in using system 22 are shown in FIG. 3.

At step 104, power is applied to the system 22 from suitable power supplies. The integrated circuits in system 22 are mounted on one or more boards such as board 24 or other suitable mounting structures. When power is applied to the system, the power is distributed to the integrated circuits in the system via power supply distribution paths. With one suitable arrangement, there are conductive paths on board 24 that distribute a positive power supply voltage Vcc and a ground power supply voltage Vss to power supply terminals associated with the integrated circuits on board 24.

The integrated circuits receive the power supply voltages. The integrated circuits contain power-on-reset logic that monitors the power supply voltages as they are applied and ensures that the circuitry on the integrated circuits is started up properly. In the example of FIG. 2, master integrated circuit 26 has an external power management circuit 72. During step 104 of FIG. 3, power management circuit 72 receives the power supply voltages Vcc and Vss at power supply inputs 100 and 102. Power management circuit 72 monitors the power supply voltages on inputs 100 and 102 and waits until they are stable. When the power supply voltages on inputs 100 and 102 have reached and maintained their desired levels for a sufficient length of time, power management circuit 72 provides an initialization control signal to master integrated circuit 26. The initialization control signal is provided to the master integrated circuit 26 over a path such as path 70. The power management circuit 72 generates this signal with sufficient strength to overcome the weak pull-down of bias circuit 74.

The master integrated circuit 26 monitors the initialization control input 68. At step 106, the master integrated circuit 26 detects the initialization control signal from the power management circuit 72 and initializes. During the initialization process, the master integrated circuit 26 obtains its initialization data from shared memory 34. For example, the master integrated circuit 26 may use an internally-stored default memory address (e.g., a bottom-boot memory address such as 0000H) to access its initialization data 44 over bus 36. Once the initialization data has been retrieved by the master integrated circuit 26, the initialization data is loaded into the master integrated circuit 26. The way in which the master integrated initializes depends on the nature of the master integrated circuit 26. If, for example, the master integrated circuit 26 is a microprocessor, the initialization data will be boot code that is loaded into memory in the microprocessor. If the master integrated circuit 26 is a programmable logic device integrated circuit, the initialization data will be configuration data that is loaded into configuration memory in the programmable logic device integrated circuit.

After the master integrated circuit 26 has been loaded with initialization data, optional initialization operations such as self-test operations may be performed by the master integrated circuit (step 108).

While the master integrated circuit 26 is loading the initialization data from shared memory 34 (step 106) and is performing optional initialization operations (step 108), the slave integrated circuits such as circuits 28, 30, and 32 complete their power-on-reset operations (step 116). The bias circuits that are associated with the initialization control signal inputs of the slave integrated circuits hold the voltages of the initialization control signal inputs low, thereby holding the slave integrated circuits in their reset state. During step 116, the JTAG communications circuitry on the slave integrated circuits receives power and becomes active. With the JTAG circuitry functional, the JTAG circuitry can receive communications from the master integrated circuit 26.

At step 110, the master integrated circuit 26 obtains the initialization data memory addresses that are to be provided to the slave integrated circuits. Because the initialization data memory addresses are customizable by a system designer, initialization data memory addresses can be selected that are unique. This ensures that the memory blocks that are used to store the initialization data for the slave integrated circuits will not conflict with each other. As shown in the illustrative shared memory 34 of FIG. 2, the memory blocks 48, 52, and 56 that are associated with the slave integrated circuits do not interfere with each other or with the memory block 44 that is used to maintain the initialization data for the master integrated circuit 26.

The master integrated circuit 26 can obtain the initialization data memory addresses using any suitable scheme. With one illustrative arrangement, the system designer creates boot code or other initialization data for the master integrated circuit in which the initialization data memory addresses of the slaves have been embedded. The master integrated circuit therefore obtains the initialization data memory addresses when the master's initialization data is retrieved from the shared memory over bus 36. With another illustrative arrangement, the master's initialization data contains information (e.g., a memory address) that informs the master integrated circuit of the storage location of the initialization data memory addresses to be used for the slaves.

After obtaining the initialization data memory addresses of the slaves, the master integrated circuit 26 uses the built-in communications capabilities of the integrated circuits in system 22 to provide each slave integrated circuit such as slave integrated circuits 28, 30, and 32 with its corresponding initialization data memory address. Preferably, the master integrated circuit 26 and the slave integrated circuits 28, 30, and 32 communicate using their JTAG capabilities. As each slave integrated circuit receives its custom initialization data memory address, the initialization data memory address is stored in that slave integrated circuit. With one suitable arrangement, each slave contains internal storage such as a JTAG initialization data memory address register into which the initialization data memory address for that slave is loaded.

After loading each slave integrated circuit with its initialization data memory address, the master integrated circuit 26 uses initialization control signals to initialize the slave integrated circuits (step 112). The master integrated circuit may, as an example, convey initialization control signals to slave integrated circuits 28, 30, and 32 using initialization control paths such as paths 94, 96, and 98 of FIG. 2.

At step 114, the slave integrated circuits 28, 30, and 32 detect the initialization control signals at respective initialization control inputs 80, 82, and 84 and initialize. During initialization operations, each slave integrated circuit uses its unique initialization data memory address to retrieve its associated initialization data from shared memory 34 over bus 36. As an example, slave 28 may receive boot code from shared memory 34 starting at initialization data address 50, slave 30 may obtain configuration data from shared memory 34 starting at initialization data address 54, slave 32 may obtain configuration data from shared memory 34 starting at initialization data address 58, etc.

Because their initialization data memory addresses are arranged to avoid memory address conflicts, each slave integrated circuit is able to load its initialization data from the same shared memory device 34. This reduces the complexity and cost of system 22, because individual memory devices are not needed to store the initialization data for each integrated circuit.

Figure 4:
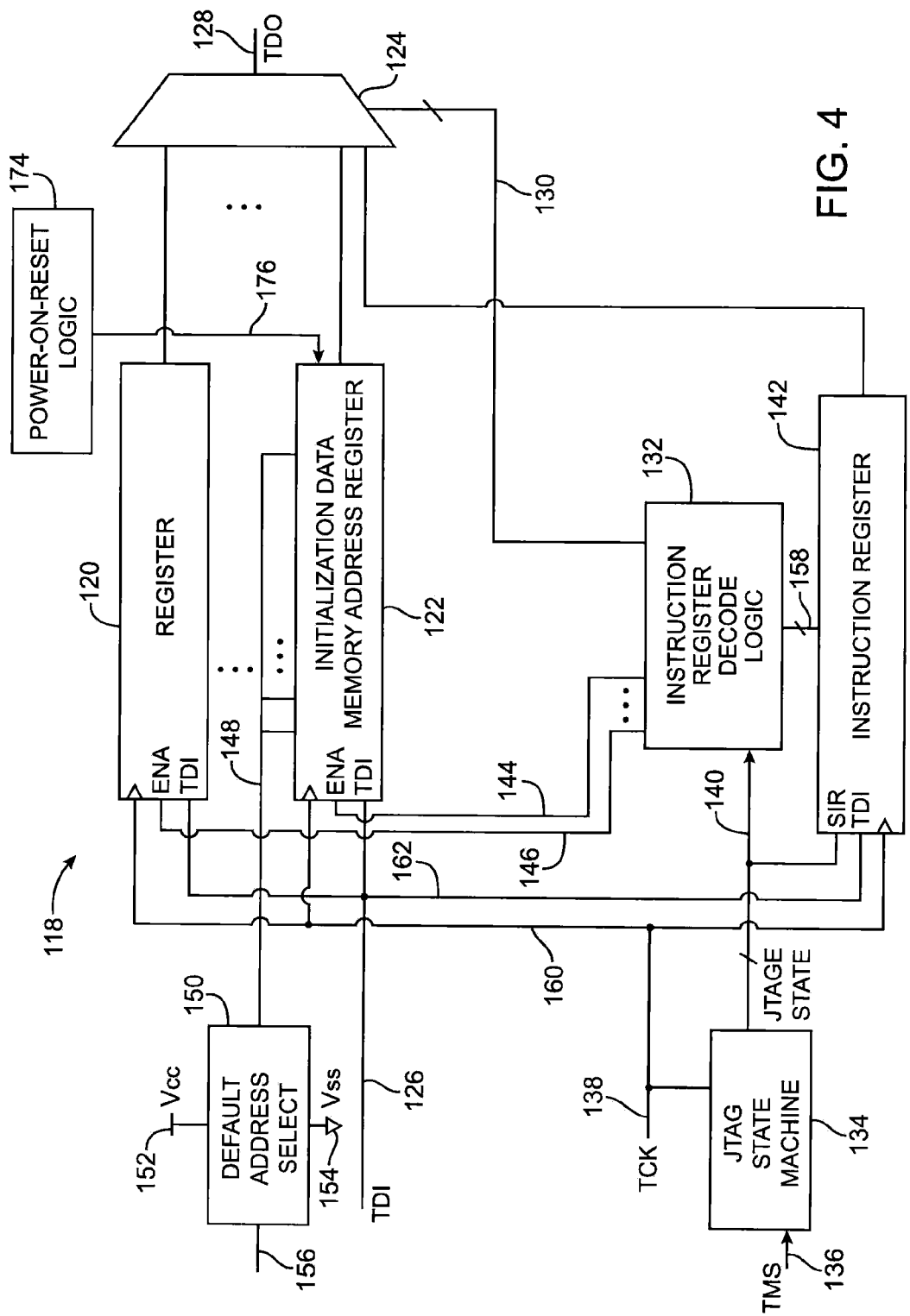
FIG. 4 is a diagram of illustrative JTAG (Joint Test Action Group) circuitry that can be used in an integrated circuit to receive a custom initialization data memory address from another integrated circuit in accordance with the present invention.

Master integrated circuit 26 may use any suitable JTAG circuitry such as conventional JTAG circuitry to communicate with slave integrated circuits 28, 30, and 32. The JTAG circuitry used by each of the slave integrated circuits 28, 30, and 32 preferably includes storage for storing the initialization data memory address of that slave integrated circuit. Illustrative JTAG circuitry 118 of the type that may be incorporated into integrated circuits 28, 30, and 32 (and 26) is shown in FIG. 4. Other types of built-in circuitry that are capable of supporting data communications after power-up and before initialization operations have been completed may be used if desired. The use of JTAG circuitry 118 of FIG. 4 is described as an example.

JTAG circuitry 118 has data registers such as data registers 120 and 122. Data register 122 is an initialization data memory address register that is used to store the initialization data memory address for the integrated circuit. The initialization data memory address is transmitted to each slave integrated circuit during step 110 of FIG. 3. Multiplexer 124 is used to select which of the data registers in circuitry 118 is connected in the path from TDI line 126 to TDO line 128. When it is desired to load initialization memory addresses into the slaves, the multiplexers 124 in each slave integrated circuit may be configured to form a chain of their initialization data memory address registers. The master integrated circuit 26 can then transmit the initialization data memory addresses for each of the slaves in series through the register chain formed by linking the TDI and TDO pins via paths such as path 60 of FIG. 2.

The setting of multiplexer 124 is controlled by a multiplexer control signal that is supplied to multiplexer 124 by instruction register decode logic 132 over path 130. Instruction register decode logic 132 monitors the instructions present in instruction register 142 using path 158.

JTAG circuitry 118 contains circuitry that implements a JTAG state machine 134. JTAG state machine receives a clock signal TCK from clock input 138. The clock signal TCK is also distributed to instruction register 142 and registers 120 and 122 via clock distribution path 160. The signal TMS is received by JTAG state machine 134 via TMS input 136. The JTAG state machine 134 changes its state to one of sixteen possible states in response to various TCK and TMS signals at its inputs. In response, the JTAG state machine 134 provides signals that are indicative of the current state of the JTAG state machine on line 140.

Instruction register decode logic 132 is responsive to the JTAG state that is provided on path 140. When the JTAG circuitry 118 is in a shift IR state (shift instruction register state), instructions can be shifted into instruction register 142 via the TDI input 126 and data path 162. Using multiplexer 124, instructions can be shifted into the instruction registers in all of the linked slaves when their JTAG circuitry is in the shift IR state. When the JTAG circuitry is in a shift DR state (shift data register state), instruction register decode logic 132 can enable an appropriate one of the data registers 120 and 122 using an appropriate one of enable lines 144 and 146. Data can then be shifted into the enabled data register using the data path 162. To load the initialization data memory address into initialization data memory address register 122, the instruction register decode logic enables initialization data memory address register 122 via enable line 144.

The JTAG circuitry 118 of FIG. 4 may contain a default address select circuit 150 that is used to load a default initialization data memory address into initialization data memory address register 122. The default address select circuit 150 may monitor the voltage on an input 156 such as a control pin. When the voltage on the input 156 has a particular value during power-up (e.g., a high voltage such as Vcc), the default address select circuit 150 can connect a logic high (e.g., positive power supply voltage terminal 152) to line 148. When the voltage on input 156 has another value during power-up (e.g., a low voltage such as Vss), the default address select circuit 150 can connect a logic low (e.g., a ground power supply voltage terminal 154) to line 148. The signal on line 148 may be distributed to each individual register element in initialization data memory address register 122.

When the slave integrated circuit is powered up, power-on-reset logic 174 generates a control signal (e.g., a logic high) on line 176. The initialization data memory address register 122 detects this control signal and, in response, loads the logic signals that are present on line 148 (e.g., the selected logic high or logic low signal) into initialization data memory address register. The loaded signals become the default address of the slave (e.g., 0000H if zeros were loaded or FFFFH if ones were loaded). The default address may be used during initialization operations in the event that the master integrated circuit 26 does not load a replacement initialization data memory address into the slave.

Figure 5:
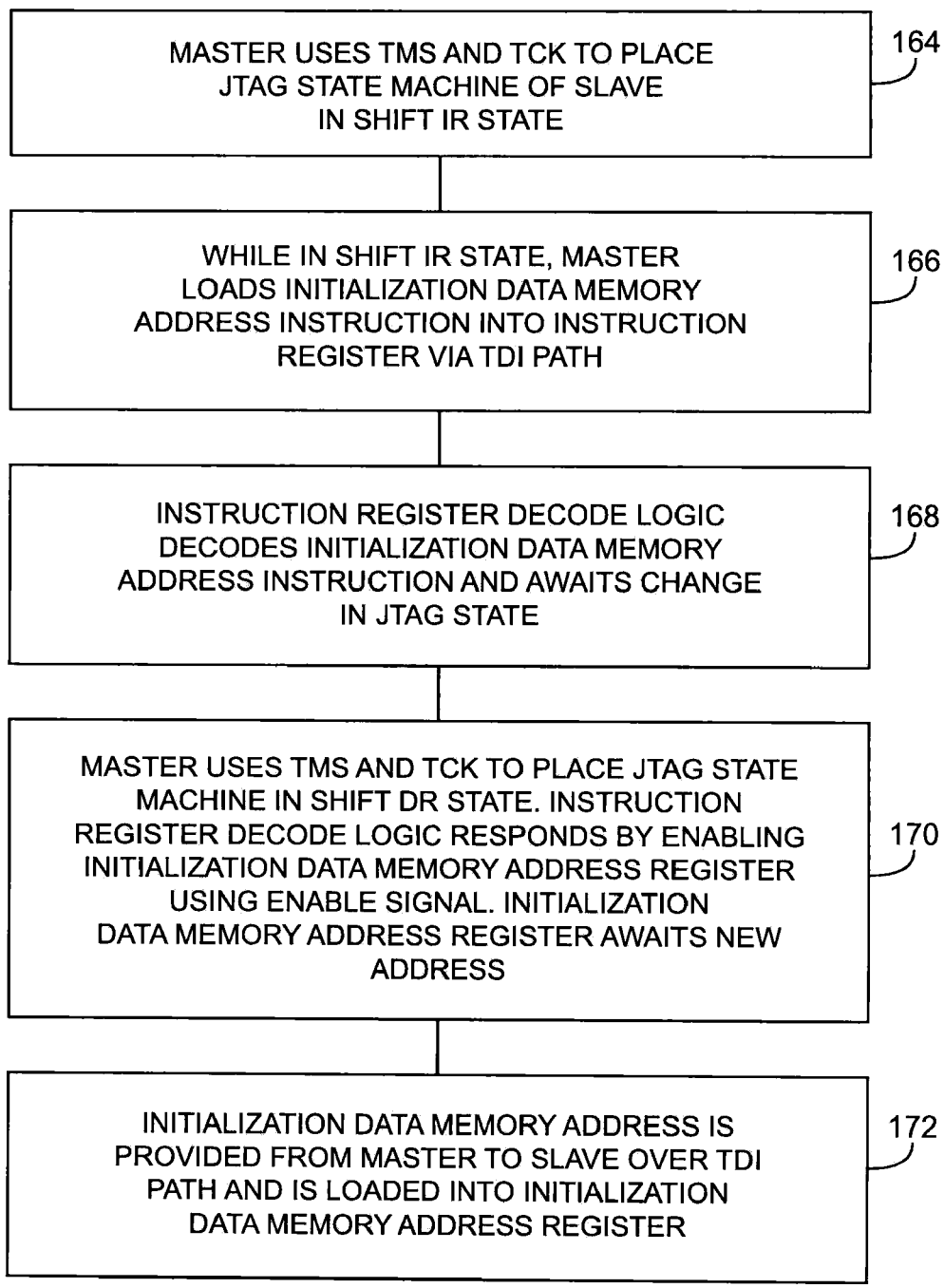
FIG. 5 is a flow chart of illustrative steps involved in using the JTAG circuitry of FIG. 4 to receive and store an initialization data memory address in accordance with the present invention.

Illustrative steps involved in using the JTAG circuitry 118 of FIG. 4 are shown in FIG. 5.

At step 164, the master integrated circuit 26 uses the TMS and TCK signals on lines 138 and 136 to place the JTAG state machine 134 into a shift IR state. The current JTAG state (shift IR) is communicated to instruction register decode logic via path 140. In the shift IR state, the instruction register decode logic 132 provides a multiplexer control signal to multiplexer 124 to connect the instruction register 142 between the TDI line 126 and TDO line 128. When there is more than one slave integrated circuit in system 22, the multiplexers in all of the slave integrated circuits are connected in this way at the same time, thereby forming an instruction register chain.

At step 166, while the JTAG circuitry 118 is in the shift IR state, the master integrated circuit 26 uses the data path through the slave integrated circuits to load an initialization data memory address instruction into instruction register 142. When there is more than one slave integrated circuit in system 22, the instruction registers in all of the slaves may be loaded with the initialization data memory address instruction in series.

At step 168, the instruction register decode logic 132, decodes the initialization data memory address instruction that has been loaded into the instruction register 142 and awaits a change in the JTAG state.

At step 170, the master integrated circuit 126 uses the TMS and TCK signals on lines 138 and 136 to place the JTAG state machine 134 in the shift DR state. Path 140 provides the JTAG state to the instruction register decode logic 132. The instruction register decode logic 132 detects the shift DR state and responds by enabling the initialization data memory address register 122 using an enable signal on enable path 144. The initialization data memory address register 122 receives the enable signal and awaits a new initialization data memory address from the master integrated circuit 26.

At step 172, the master integrated circuit 26 provides the initialization data memory address to the initialization data memory address register of the slave over a JTAG data path such as path 60 of FIG. 2. If there are multiple slave integrated circuits in system 22, the multiplexers 124 in each slave are configured to form a chain of initialization data memory address registers. The master can load each slave's initialization data memory address register in series through this chain. Once the initialization data memory address for each slave integrated circuit has been loaded into the initialization data memory address register for that slave integrated circuit, the master can use initialization control signals to initialize the slave integrated circuits (steps 112 and 114 of FIG. 3).

The foregoing is merely illustrative of the principles of this invention and various modifications can be made by those skilled in the art without departing from the scope and spirit of the invention.

What is claimed is:

1. A method for avoiding memory address conflicts between integrated circuits in a system that loads initialization data from a shared memory, comprising:
   at a first of the integrated circuits, obtaining an initialization data memory address for a second of the integrated circuits;
   using the first integrated circuit to load the initialization data memory address into storage in the second integrated circuit; and
   during initialization operations for the second integrated circuit, using the loaded initialization data memory address in the second integrated circuit to retrieve initialization data for the second integrated circuit from the shared memory.

2. The method defined in claim 1 further comprising:
   with the first integrated circuit, using an initialization control signal to initialize the second integrated circuit.

3. The method defined in claim 1 wherein the second integrated circuit is a programmable logic device integrated circuit having configuration memory and wherein using the loaded initialization data memory address in the second integrated circuit comprises using the loaded initialization data memory address in the programmable logic device integrated to retrieve configuration data for the programmable logic device integrated circuit from the shared memory.

4. The method defined in claim 1, wherein the first integrated circuit is a microprocessor, wherein the second integrated circuit is a programmable logic device integrated circuit having configuration memory, wherein using the loaded initialization data memory address in the second integrated circuit comprises using the loaded initialization data memory address in the programmable logic device integrated circuit to retrieve configuration data for the programmable logic device integrated circuit from the shared memory, the method further comprising:
   retrieving boot code for the microprocessor from the shared memory.

5. The method defined in claim 1 wherein the first and second integrated circuits include JTAG circuitry and wherein using the first integrated circuit to load the initialization data memory address into the storage in the second integrated circuit comprises using the JTAG circuitry in the first and second integrated circuits to load the initialization data memory address into the storage.

6. The method defined in claim 1 wherein the first and second integrated circuits include JTAG circuitry, wherein the storage in the second integrated circuit comprises an initialization data memory address register in the JTAG circuitry of the second integrated circuit, and wherein using the first integrated circuit to load the initialization data memory address into the storage in the second integrated circuit comprises using the JTAG circuitry in the first and second integrated circuits to load the initialization data memory address into the initialization data memory address register in the second integrated circuit.

7. The method defined in claim 1 wherein the first and second integrated circuits include JTAG circuitry, wherein the storage in the second integrated circuit comprises an initialization data memory address register in the JTAG circuitry of the second integrated circuit, wherein the JTAG circuitry in the second integrated circuit comprises a default address select circuit, and wherein using the first integrated circuit to load the initialization data memory address into the storage in the second integrated circuit comprises using the JTAG circuitry in the first and second integrated circuits to load the initialization data memory address into the initialization data memory address register in the second integrated circuit, the method further comprising using the default address select circuit to load a default initialization data memory address into the initialization data memory address register upon powering up the second integrated circuit and before the first integrated circuit loads the initialization data memory address into the initialization data memory address register.

8. The method defined in claim 1 wherein using the first integrated circuit to load the initialization data memory address into storage in the second integrated circuit comprises transmitting the initialization data memory address over a first data path, wherein using the loaded initialization data memory address in the second integrated circuit to retrieve initialization data for the second integrated circuit from the shared memory comprises using a second data path, and wherein the first data path is separate from the second data path.

9. The method defined in claim 1 wherein using the first integrated circuit to load the initialization data memory address into storage in the second integrated circuit comprises transmitting the initialization data memory address over a JTAG data path and wherein using the loaded initialization data memory address in the second integrated circuit to retrieve initialization data for the second integrated circuit from the shared memory comprises using a second data path comprises retrieving the initialization data for the second data path from the shared memory over a shared memory bus.

10. A method for avoiding memory address conflicts in a system having a shared memory, a master integrated circuit, and a plurality of slave integrated circuits each of which contains an initialization data memory address register, wherein the shared memory contains a plurality of non-overlapping memory blocks each of which contains initialization data for a respective one of the integrated circuits, comprising:
   at the master integrated circuit, obtaining a unique initialization data memory address for each of the slave integrated circuits, each unique initialization data memory address corresponding to a start address for accessing the initialization data stored in a respective one of the blocks of memory in the shared memory;
   with the master integrated circuit, loading the unique initialization data memory addresses of each slave integrated circuit into the initialization data memory address register of that slave integrated circuit;
   after the master integrated circuit has loaded the unique initialization data memory addresses into the initialization data memory address registers of the slave integrated circuits, using the master integrated circuit to initialize the slave integrated circuits with initialization control signals; and at the slave integrated circuits, detecting the initialization control signals, and, in response, retrieving the initialization data from the plurality of non-overlapping memory blocks in the shared memory using the loaded unique initialization data memory addresses.

11. The method defined in claim 10 further comprising:
with the master integrated circuit, loading initialization data from the shared memory into the master integrated circuit before loading the unique initialization data memory addresses into the initialization data memory address registers.

12. The method defined in claim 10 further comprising:
with the master integrated circuit, loading initialization data from the shared memory into the master integrated circuit before loading the unique initialization data memory addresses into the initialization data memory address registers, wherein obtaining the unique initialization data memory address for each of the slave integrated circuits comprises obtaining the unique initialization data memory addresses from the initialization data loaded into the master integrated circuit.

13. The method defined in claim 10 further comprising:
with the master integrated circuit, loading initialization data from the shared memory into the master integrated circuit before loading the unique initialization data memory addresses into the initialization data memory address registers, wherein obtaining the unique initialization data memory address for each of the slave integrated circuits comprises obtaining the unique initialization data memory addresses from the initialization data loaded into the master integrated circuit, wherein the master integrated circuit is a microprocessor, wherein the initialization data loaded into the master integrated circuit comprises boot code, and wherein obtaining the unique initialization data memory addresses comprises obtaining the unique initialization data memory addresses from the boot code.

14. The method defined in claim 10 further comprising:
with the master integrated circuit, loading initialization data from the shared memory into the master integrated circuit before loading the unique initialization data memory addresses into the initialization data memory address registers, wherein obtaining the unique initialization data memory address for each of the slave integrated circuits comprises obtaining the unique initialization data memory addresses from the initialization data loaded into the master integrated circuit, wherein the master integrated circuit is a microprocessor, wherein the initialization data loaded into the master integrated circuit comprises boot code, wherein obtaining the unique initialization data memory addresses comprises obtaining the unique initialization data memory addresses from the boot code, wherein a given one of the slave integrated circuits comprises a programmable logic device integrated circuit having configuration memory, wherein retrieving the initialization data from the memory block associated with the given one of the slave integrated circuits comprises retrieving configuration data from the memory block associated with the given one of the slave integrated circuits and loading the retrieved configuration data into the configuration memory.

15. The method defined in claim 10 wherein the master integrated circuit is a microprocessor having a reset input and wherein at least one of the slave integrated circuits comprises a programmable logic device integrated circuit having an initialization control input and configuration memory, the method comprising:
resetting the master integrated circuit using the reset input;
after the master integrated circuit has been reset, using the master integrated circuit to initialize the programmable logic device integrated circuit by using the master integrated circuit to provide an initialization control signal to the initialization control input of the programmable logic device integrated circuit; and
in response to the initialization control signal that is provided to the initialization control input of the programmable logic device integrated circuit, using an initialization data memory address stored in the initialization data memory address register in the programmable logic device integrated circuit to retrieve configuration data for the programmable logic device integrated circuit from the shared memory.

16. The method defined in claim 10, wherein the system includes a power management circuit, wherein the master integrated circuit is a microprocessor having a reset input, and wherein at least one of the slave integrated circuits comprises a programmable logic device integrated circuit having an initialization control input and configuration memory, the method comprising:
when the power management circuit detects that power supply voltages have reached appropriate levels and are stable, using the power management circuit to apply a reset signal to the reset input to reset the master integrated circuit;
after the master integrated circuit has been reset, using the master integrated circuit to initialize the programmable logic device integrated circuit by using the master integrated circuit to provide an initialization control signal to the initialization control input of the programmable logic device integrated circuit; and
in response to the initialization control signal that is provided to the initialization control input of the programmable logic device integrated circuit, using an initialization data memory address stored in the initialization data memory address register in the programmable logic device integrated circuit to retrieve configuration data for the programmable logic device integrated circuit from the shared memory.

17. The method defined in claim 10 wherein the slave integrated circuits contain communications circuitry that is active after the slave integrated circuits have powered up but before the slave integrated circuits have been initialized, the method further comprising:
with the master integrated circuit, loading the unique initialization data memory addresses into the initialization data memory address registers of the slave integrated circuits using the communications circuitry.

18. The method defined in claim 10 wherein the slave integrated circuits contain JTAG circuitry that is active after the slave integrated circuits have powered up but before the slave integrated circuits have been initialized, the method further comprising:
with the master integrated circuit, loading the unique initialization data memory addresses into the initialization data memory address registers of the slave integrated circuits using the JTAG circuitry.

19. A programmable logic device integrated circuit comprising:
programmable logic;

configuration memory in which configuration data is stored that produces static output signals that program the programmable logic to implement a custom logic function;

communications circuitry that is active before the programmable logic device integrated circuit has been configured by loading the configuration data into the configuration memory; and an initialization data memory address register in the communications circuitry that stores a custom configuration data memory address that has been received from another integrated circuit using the communications circuitry, wherein the configuration data memory address defines a memory block location in a shared memory from which the configuration data is retrieved for loading into the configuration memory.

20. The programmable logic device integrated circuit defined in claim 19 wherein the communications circuitry comprises:

an instruction register that receives instructions from the other integrated circuit; and instruction register decode logic that monitors instructions in the instruction register, wherein the initialization data memory address register has an enable input and wherein the instruction register decode logic applies an enable signal to the enable input when storing the configuration data memory address in the initialization data memory address register.

* * * * *